(12) United States Patent
Burnett

(10) Patent No.: US 6,477,988 B2
(45) Date of Patent: Nov. 12, 2002

(54) DOGGY WRAP

(76) Inventor: Kathy L. Burnett, 6027 Manchester La. SE., Lacey, WA (US) 98513

( * ) Notice: Subject to any disclaimer, the term of this patent is extended or adjusted under 35 U.S.C. 154(b) by 0 days.

(21) Appl. No.: 09/757,675

(22) Filed: Jan. 11, 2001

(65) Prior Publication Data

US 2002/0088410 A1 Jul. 11, 2002

(51) Int. Cl.$^7$ ................................. A01K 13/00
(52) U.S. Cl. ........................... 119/850; 54/79.1
(58) Field of Search ............... 119/850; 54/79.1; D30/145

(56) References Cited

U.S. PATENT DOCUMENTS

| | | | | |
|---|---|---|---|---|
| 1,595,834 A | * | 8/1926 | Griffiths | ............ 119/850 |
| 2,273,706 A | * | 2/1942 | Hafner | ............ 54/79.1 |
| D337,864 S | * | 7/1993 | Cullington et al. | ............ 54/79.1 |
| 6,089,194 A | * | 7/2000 | LaBelle | ............ 119/850 |
| 6,119,635 A | * | 9/2000 | Powell-Lesnick | ............ 119/850 |
| 6,138,611 A | * | 10/2000 | Thielemann | ............ 119/850 |

* cited by examiner

Primary Examiner—Charles T. Jordan
Assistant Examiner—Elizabeth Shaw

(57) ABSTRACT

An improved dog garment having a single fastener which secures jacket to the animal and allows ease of use. This garment provides warmth and protection by covering the chest and back of the animal. It is a single pattern design for the ease of manufacturing. It's simplicity allows for easy application and removal from the animal and if made from washable fabrics easy to clean.

7 Claims, 3 Drawing Sheets

DOGGY WRAP

BACKGROUND—FIELD OF INVENTION

This invention relates to dog garments which protects the back, chest and under belly and to add warmth to the canine or other animal.

BACKGROUND—DESCRIPTION OF PRIOR ART

Short hair dogs with bare chests or under belly, get cold in the winter or wet weather. Jackets developed over the years have become decorative and complicated failing the primary objective of keeping the pet warm and having a garment that is easy to put on and take off.

U.S. Pat. No. 265,516 to Wacker is a horse blanket design for horses and impractical to use with canines. The design consists of at least three fasteners and is draped on the animal and not formed. This design is widely used for jackets for canines and fails to keep the chest and under belly covered.

U.S. Pat. No. 5,060,458 to Curtis is a complicated design using multiple fasteners and is complicated to form to a canine. The patent has a underneath piece which is supposed to be fastened under the dog.

U.S. Pat. No. 313,676 to Indursky is another design using multiple fasteners and fails to cover the chest or underneath of the pet.

U.S. Pat. No. 5,359,963 to Jesse Jr. is a sweater design which with specific leg wraps that hold the sweater in place for the dog. This can be difficult to put on an animal having the applicator guide this garment to it's proper fit. This garment is made for "show" and "performance" and is way to difficult and impractical to use on an everyday basis.

U.S. Pat. No. 372,563 to Waugh Jr. is a multiple fastening dog garment which is guided on the canines front legs. This jacket resembles a rain jacket for humans which fastens in the back. It appears to be difficult to put on and impractical designed.

U.S. Pat. No. 397,533 to Lidis uses multiple straps to secure and fit the jacket and does not cover the chest of the animal between the legs. This design requires the applicator to adjust the fit of the jacket using two straps and fails to keep the canine warm on his chest.

Jackets developed were multi-pieced or had multiple straps to secure the jacket to the pet. It appears that a majority of the jackets were smaller versions of a horse blanket except for a few. Those exceptions contained multiple piece construction, which makes it difficult to manufacture in most cases impractical to use on a day to day basis. None have a truly wrap around design of single construction which provides comfort and protection for the pet with ease to put on and take off with a single fastener.

SUMMARY

In accordance with the present invention a one piece construction which forms around the canine covering the chest and underbelly of the animal and fastens with a single strap.

OBJECTS AND ADVANTAGES

Several objects and advantages of the present invention are:
(a) To provide warm cover which wraps around the chest of the animal.
(b) To provide an easy application of the jacket by having only one hook and loop fastener
(c) To provide an easy pattern for it's construction (One piece construction)
(d) Jacket can be made out of a variety of known and unknown fabrics

DRAWING FIGURES

REFERENCE NUMERALS IN DRAWINGS

1 Hook and Loop fastener
2 Darts
3 Head hole
4 Strap
5 Leg Hole Area

DESCRIPTION OF THE PREFERRED EMBODIMENT

While the "Doggy Wrap" will be described more fully with reference to the accompanying drawings, in which particular embodiments are shown, it is to be understood at this outset that persons skilled in the art may modify the "Wrap" of the present invention while still achieving the favorable results of the invention. Accordingly, the description which follows is to be understood as a broad teaching disclosure directed to persons of skill in the appropriate arts and not as limiting upon the "Doggy Wrap" of the present invention.

With reference now to the drawings, and in particular to FIG. 1 through FIG. 4 thereof, a Jacket embodying the principals and concepts of the present invention and generally designated single pattern design with a single securing strap (4) by the reference "Doggy Wrap" will be described.

Figure 1:
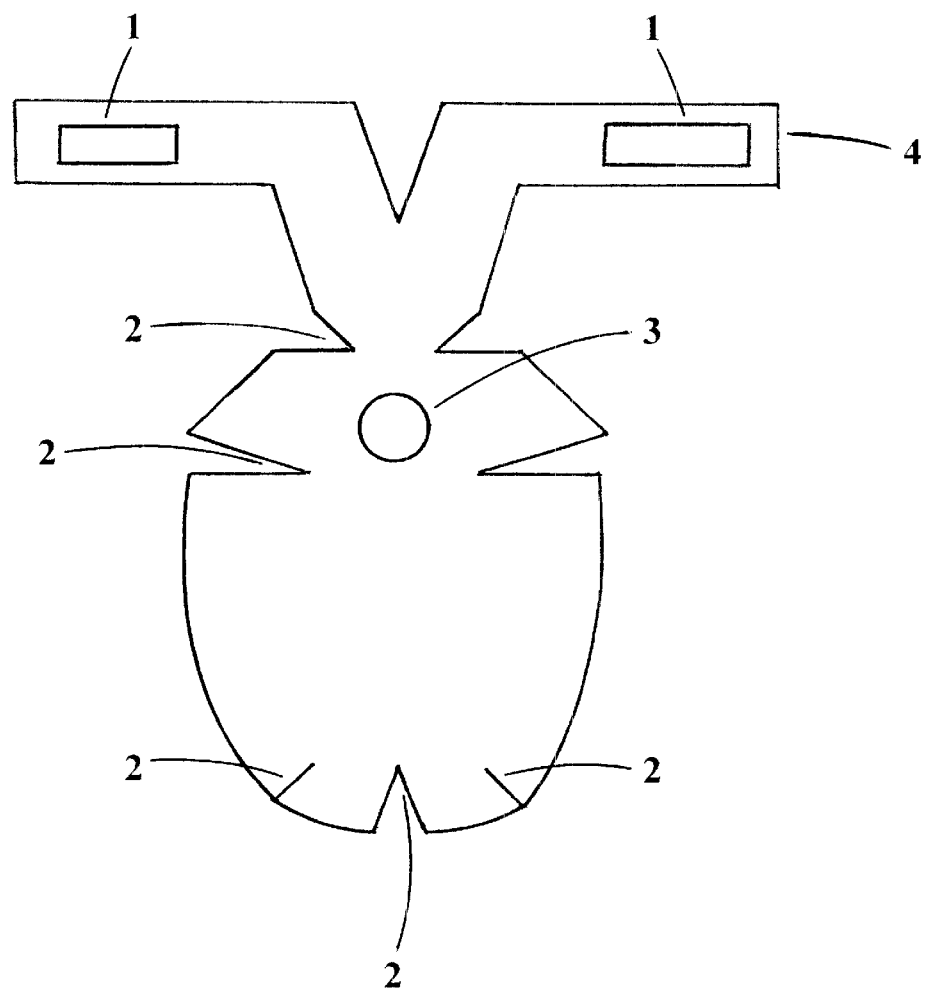
FIG. 1 shows the single pattern design pointing out darts and fastener
Figure 3:
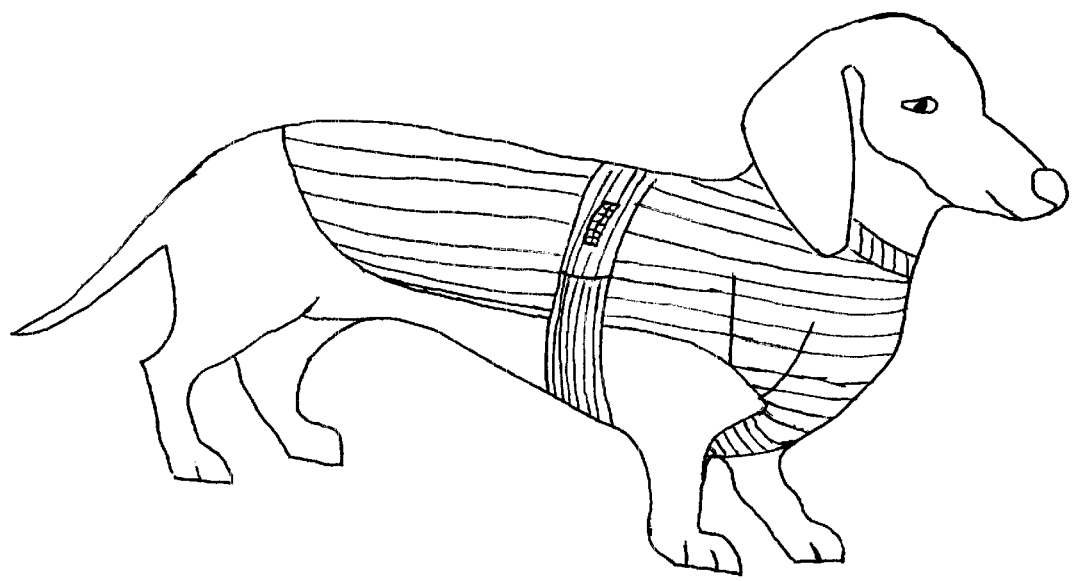
FIG. 3 shows a representation of how the jacket would fit on a canine

A preferred embodiment of the present invention is illustrated in FIG. 1 (Pattern View). The one piece pattern with a single securing strap (4). The totality of the patterns simplicity, all encompassing, covering the major areas of the animal by including a center head hole (3) and using darts to form it to the body of the animal. The material used in construction may consist of any known and unknown malleable fabrics. Primarily construction consisted of soft colorful fleece material. Measurements of the pattern vary from size and basic shape of the animal intended. Length of darts and hole size also may vary from size and shape. The hole (3) is collared for comfort and appearance of the jacket. Securing strap (4) varies in width and length and when the pattern is finalized wraps around the torso of the animal securing the jacket from the underneath of the front legs wrapping the chest plate of the pattern against the chest. Darts (2) are cut to varying lengths depending on size and shape of the intended animal and forms the fabric to fit the animals dimensions. FIG. 3 shows final fitting to a canine

ADDITIONAL EMBODIMENTS

Figure 2:
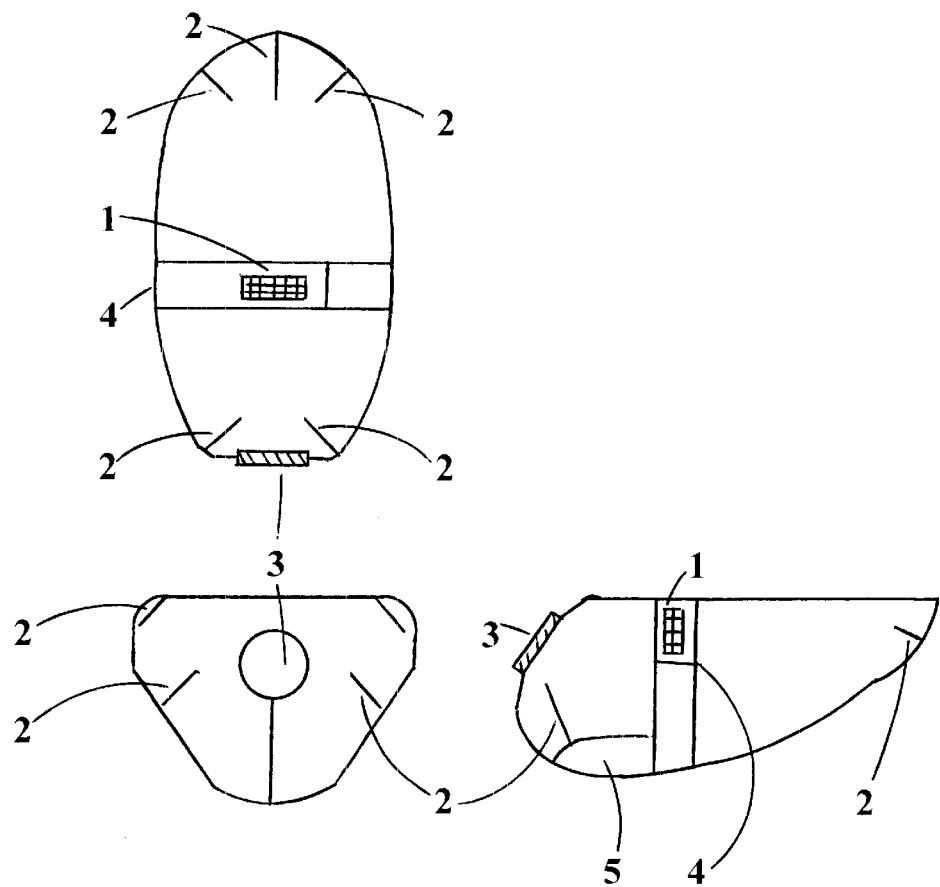
FIG. 2 shows a front side and top view of the completed pattern

Additional embodiments are shown in FIGS. 2 and 3 showing top, side, front and a side view of how the jacket might be worn on a canine. View of which outlines the body or torso of the animal that wears it. Strap (4) wrapping around the torso provides security for the jacket. The use of the hook and loop fastner (1) provides ease in securing as well as the use of one strap. Darts (2) form to the back, chest and hips of the animal.

ADVANTAGES

From the description above, a number of advantages of my "doggy wrap" becomes apparent over traditional pet jackets.
(a) The construction of the jacket is simple. It is a one piece pattern design which, when darting allows for the jacket to form to the animals body shape, if needed.
(b) The use of a slip in head hole and one securing strap means ease of taking the jacket on or off.
(c) It covers the chest of the animal, therefore, providing coverage and insulation to a part of the body which is almost always lacking.
(d) It provides freedom of movement to the animal and does not hinder the ability of the animal to urinate and defecate.

OPERATION—FIG. 3

The manner of using the "doggy wrap" is similar to putting a pull over short sleeve shirt on a child. By pressing the animals head through the head hole (3) and feeding the chest plate with strap through the front legs, one only need to secure the strap around the torso. Strap should be secure but not overly restrictive.

To remove the "doggy wrap", one first un-straps (4) the torso and slips the animal out of the head hole(3).

CONCLUSIONS, RAMIFICATIONS, AND SCOPE

Accordingly, the reader will see that the "doggy wrap" protects canine's by keeping warm and covering the chest and back of the dog. This jacket may be assembled by a number of different fabrics and colors for style and weather conditions. Furthermore, the "doggy wrap" has additional advantages in that:

The construction of the jacket is simple. It is a one piece pattern design which, with use of the darts allows for the jacket to form to the animals body shape.

The use of a slip in head hole and one securing strap means ease of taking the jacket on or off.

It covers the chest of the animal, therefore, providing coverage, protection and insulation to a part of the body which is almost always lacking.

It provides freedom of movement to the animal and does not hinder the ability of the animal to urinate and defecate.

I claim:

1. An animal garment comprising:
    (a) single or multiple sheet layers of material, which may include but not limited to cotton, fleece or nylon, and
    (b) cut from a pattern with a circle head hole, fitting over the head, on to the back, and
    (c) wrapping between the front legs of a pet, and
    (d) securing with a single hook and loop fastener attached to the top of one side of the fabric and the underneath of the opposite side.

2. The pet garment of claim 1, wherein said head hole cutout is O-shaped.

3. The pet garment of claim 1, is a form fitting garment that conforms to the contours of the animal's body using darts.

4. The garment of claim 3, extends to the length of the animals back.

5. The garment of claim 3, further has a chest protective section that:
    (a) covers from the neck to the mid underbelly of the animal, and
    (b) fits between the two front legs and covers the breast of the animal.

6. The garment of claim 3, further has straps, which are part of the one pattern cutout, joined by a single fastener, to secure the "wrap" to the body of the animal.

7. The fastener of claim 6, wherein said fastening means comprise a hook and loop fastener sewn to the fabric.

* * * * *